United States Patent [19]

Nagli et al.

[11] Patent Number: 5,796,113
[45] Date of Patent: Aug. 18, 1998

[54] METHODS AND APPARATUS FOR RECORDING AND READING-OUT AN IONIZATION RADIATION IMAGE

[75] Inventors: Lev Nagli, Petah Tikva; Abraham Zvi Meiri, Haifa, both of Israel

[73] Assignee: Z.M.Z. Advanced Systems Ltd., Haifa, Israel

[21] Appl. No.: 726,340

[22] Filed: Oct. 3, 1996

Related U.S. Application Data

[60] Provisional application No. 60/004,858 Oct. 5, 1995.

[51] Int. Cl.$^6$ ........................................... G01T 1/10
[52] U.S. Cl. ........................... 250/483.1; 250/584
[58] Field of Search ........................... 250/584, 585, 250/586, 337, 484.4, 484.3, 483.1, 487.1

[56] References Cited

U.S. PATENT DOCUMENTS

| | | |
|---|---|---|
| 3,859,527 | 1/1975 | Luckey . |
| 4,258,264 | 3/1981 | Kotera et al. . |
| 4,261,854 | 4/1981 | Kotera et al. . |
| 4,792,691 | 12/1988 | Morlotti et al. ............ 250/484.4 |
| 4,926,047 | 5/1990 | Takahashi et al. . |
| 5,025,159 | 6/1991 | Miller et al. ............... 250/337 |
| 5,028,509 | 7/1991 | Shimada et al. . |
| 5,180,610 | 1/1993 | Brandner et al. . |
| 5,206,514 | 4/1993 | Brandner et al. . |
| 5,227,097 | 7/1993 | Brandner et al. . |
| 5,422,208 | 6/1995 | Kojima et al. ............. 250/588 |

FOREIGN PATENT DOCUMENTS

| | | |
|---|---|---|
| 51-29889 | 3/1976 | Japan . |
| 1462769 | 1/1977 | United Kingdom . |

OTHER PUBLICATIONS

G.I. Vlasov et al., "Some Physical Phenomena in Activated Alkali Halide Crystals Related To The Possibility Of Optical Information Processing", Translated by L. Nagli from the Russian Journal Avometria, 1980, pp. 1–18.

Plyavin et al., Luminescence of Crystals, Molecules, and Solutions—Proceedings of the International Conference on Luminescence held in Leningrad, USSR, Aug. 1972, Plenum Press, New York, "Luminescent Alkali Halide Crystal Memory Elements", pp. 682–684.

*Primary Examiner*—Michael J. Tokar
*Assistant Examiner*—Richard Hanig
*Attorney, Agent, or Firm*—Greenblum & Bernstein, P.L.C.

[57] ABSTRACT

A method of acquiring an ionizing radiation image including, irradiating a material with patterned ionizing radiation, exciting the irradiated material with excitation radiation to emit light in accordance with the pattern and acquiring the emitted light. The excitation radiation has a wave length which does not cause substantial electron-hole recombinations in said material. Preferably, the irradiation forms luminescent centers in the material and the excitation radiation has a wave length suited for excitation of the luminescent centers.

52 Claims, 9 Drawing Sheets

METHODS AND APPARATUS FOR RECORDING AND READING-OUT AN IONIZATION RADIATION IMAGE

CROSS REFERENCE TO RELATED APPLICATION

This application claims the benefit of U.S. Provisional application Ser. No. 60/004,858, filed Oct. 5, 1995, the disclosure of which is incorporated by reference in its entirety.

FIELD OF THE INVENTION

The present invention relates to the art of acquiring and reproducing images corresponding to ionizing radiation and in particular to reusable media for X-ray image acquisition.

BACKGROUND OF THE INVENTION

Most X-ray imaging systems today use photographic plates to acquire and store images. Such systems have many shortcomings including their use of non-recyclable media, generation of toxic wastes and waiting time for development.

It is known in the art to acquire and store X-ray images using certain types of phosphor storage materials instead of film. The two main phosphor types used are thermo-stimulatable phosphors and photo-stimulatable phosphors.

The disclosures of U.S. Pat. Nos. 3,859,527, 4,258,264, 4,261,854, 4,926,047, 5,180,610, 5,028,509, 5,206,514 and 5,227,097 and "Luminescent Alkali Halide Crystal Memory Elements", by I. K. Plyavin, V. P. Objedkov, G. K. Vale, R. A. Kalnin and L. E. Nagly in "Luminescence of Crystals, Molecules, and Solutions, the Proceedings of the International Conference on Luminescence, Leningrad, USSR, August 1972", edited by Frede Williams, published by Plenum Press, New York, 1973, and incorporated herein by reference. These documents disclose materials, apparatus and methods relating to photo-stimulation. In particular, they describe irradiating a doped alkali-halide crystal with a pattern of ionizing radiation to create local, relatively stable, electron-centers and hole-centers according to the pattern of the radiation. Read-out of the pattern is performed by photo-stimulating the electrons by irradiating the crystal with light of a suitable wavelength. The stimulated electrons recombine with holes, which causes light to be emitted from the crystal, effectively reproducing the stored radiation pattern. Typically, the stimulation light is red or infra-red light.

U.S. Pat. No. 3,859,527, British Patent No. 1,462,769 and Japanese Patent Publication No. 29,889/1976, the disclosures of which are incorporated herein by reference, disclose materials, apparatus and methods related to thermo-stimulation. In particular, a doped selenide crystal is irradiated with a pattern of ionizing radiation as in the method utilizing photo-stimulation. Read-out of the pattern is performed by heating the crystal to reduce restriction of electron movement in the crystal. The electrons then recombine with holes and emit light.

Many types of photo-stimulatable and thermo-stimulatable materials are known in the art, for example, activated alkali-halide crystals (RbBr:Tl, KBr:In, KI:Tl, etc.), Europium-activated Barium fluoro-halides (BaFBr:Eu) and activated Zinc Sulfide (ZnS:Ag).

Some of the systems disclosed above use a polycrystal or a powdered crystal mixed with a binder instead of a single crystal. However, such materials have the disadvantage of scattering both stimulating and emitted light so that the resulting resolution is lower than with single crystal receptors.

The abovementioned references also disclose image read-out apparatus. One method of read-out includes serially scanning the crystal with a light beam, such as a laser beam and sensing the emitted light with an optical sensor, generally after amplification by a photomultiplier. An alternative read-out method includes heating or photo-stimulating the entire crystal at once and acquiring an image, simultaneously, of all the light emitted by the crystal. It should be noted that the stimulation wavelength and the illumination wavelength are far enough apart so measurement of the emitted light can be effected without interference from the stimulation light.

A main drawback of the prior art read-out methods is that reading the crystal also erases it. Similarly, exposing the crystal to room/ambient lighting conditions can discharge the stored pattern. In addition, read-out resolution is reader-noise limited in both serial and simultaneous read-out methods because of the low levels of light that are emitted, which results in substantial image noise. Furthermore, scattering of light within the crystal partially degrades as yet unread portions of the crystal.

A further disadvantage of prior art read-out methods is that the image must be sampled at the highest desired resolution the first time that it is read-out, even though only a small part of it is actually of interest, since it is impossible to reread a region of interest. This requires very large memories for storing the high resolution image and results in relatively slow read-out of the image for the serial read-out method.

Another drawback of the prior art is that, due to the physical properties of the electron and hole centers mechanism, the density of electron and hole centers and, thus, the maximal contrast resolution obtainable, are limited to $10^{16}$ electron-centers/cm$^3$ at room temperature.

However, the main drawback of prior art systems is that the resolution/contrast tradeoffs possible in these systems (using detector crystals) are not as good as standard X-ray film.

SUMMARY OF THE INVENTION

It is an object of some aspects of the present invention to provide a reusable detector material having sufficient quality to be used instead of X-ray film for many applications, including but not limited to industrial X-ray imaging, general medical X-ray imaging, mammography and dental X-ray imaging. Generally, the required radiation dosage using the present invention is lower than required in the prior art. In addition, the dynamic range of the detector material is typically greater than the dynamic range of film.

The present invention utilizes a detector-radiation interaction which is different from that used in the prior art, so that the ionizing radiation leaves a semi-permanent record on an imaging crystal. The record is not substantially affected by the read-out process so that improved read-out techniques may be applied. Moreover, the material can be reused since heating of the crystal erases this semi-permanent record.

In accordance with a preferred embodiment of the present invention, a ionizing radiation acquisition/storage device uses a doped crystal having the following formula:

$$A^{i}B^{vii}:M^{2+}$$

wherein $A^{i}$ is an alkaline metal, preferably, Li, Na, K, Rb or Cs; $B^{vii}$ is a halogen, preferably, F, Cl, Br or I; and $M^{2+}$ is an activator di-valent ion preferably selected from the group $Ge^{2+}$, $Sn^{2+}$ and $Pb^{2+}$. The concentration of the activator $M^{2+}$ is preferably between 0.1 and 1 m% (i.e., approximately $10^{18}$–$10^{19}$ $cm^{-1}$). Other materials such as disclosed in the background may also be applicable. These materials are not, per se, new. Such materials have been used in the past for storing images of radiation, however, the interaction used is new, so that improved imaging is achieved.

The inventors have discovered that irradiating the doped crystal with ionizing radiation creates free electrons and holes. However, some of the electrons are captured by $M^{2+}$ activator ions. The resulting $M^{1+}$ ions are luminescent. Generally, these $M^{1+}$ ions are stable at room temperature and are not destroyed by irradiation at an excitation wavelength, which is different from that used for stimulating electron-hole recombinations. Thus, a crystal irradiated with ionizing radiation becomes patterned with a luminophor which is not erased by excitation.

In the prior art processes of photo-stimulatable read-out, red or infra-red light is used to photo-stimulate the crystal and it emits visible light. In a preferred embodiment of the present invention, the crystal is excited with ultra-violet light and emits red or near infra-red light.

The inherent spatial and gray level resolution of the crystals using the new read-out method is higher than that available in the prior art, since the highest possible density of electron-centers at room temperature is about $10^{16}/cm^3$ while the highest possible density of activated $M^{1+}$ ions is about $10^{19}/cm^3$. Typical densities resulting from exposure to 1 R are $3-5*10^{12}$ electron-centers/$cm^3$ vs $2-10*10^{13}$ $M^{1+}$ ions/$cm^3$ In a preferred embodiment of the present invention, an irradiated crystal is read several times. Preferably, the read-outs are combined to form a less noisy image. Alternatively or additionally, long read-out times are used to capture a larger amount of light for each pixel in the image. Preferably, the crystal is exposed to light prior to read-out, which stimulates electrons in optically stimulatable electron-centers, such as M-centers and F-centers. This stimulation creates free electrons which combine with $M^{2+}$ ions to form additional $M^{1+}$ ions, enhancing the contrast of the $M^{1+}$ read-out.

In a preferred embodiment of the present invention, a detector is doped with a combination of different dopants, preferably in different concentrations. This results in a luminophor capable of emitting varied colors and shades.

Preferably, a thin crystal is used because thin crystals yield a higher spatial resolution than thick crystals. In the prior art, such a crystal could not be used effectively since the light output was too low. Thus, in the prior art a trade-off had to be made between contrast and spatial resolution. This resulted in a generally inferior image. In the present system, in part because the storage efficiency is higher and in part because the detector crystal can be read a number of times, the designer has greater freedom in making the trade-off The crystal, or at least the active thickness of the crystal, can be thinner than in the prior art. In general, the noise in the read-out image comprises X-ray and X-ray crystal interaction noise, which can not be reduced by rereading the crystal and camera and excitation signal noise which can be substantially reduced by rereading the stored image.

In a preferred embodiment of the invention the detector crystal is a thick undoped crystal with a thin, doped (active), layer. A preferred method of producing a surface doped crystal comprises:

(a) contacting one face of an undoped crystal with a dopant; and (b) heating the crystal and doping material for a given period of time at a given temperature.

The temperature and time period are dependent on the desired thickness of the doping layer, the dopant and the form of the dopant. Typically, the temperature is below the melting temperature of the crystal. The dopant may be in the form of a gas or in the form of a liquid in contact with the face of the crystal on which the active layer is to be formed.

Alternatively, a detector crystal which has both a heavily doped thin layer and a lightly doped thick layer is used. This type of crystal yields a generally higher spatial resolution than a thick, evenly doped crystal, while retaining high sensitivity. Preferably, the relative doping of crystal layers is configured so that the thin layer emits twice as much light as the thick layer when equally excited and irradiated. Alternatively or additionally, only a thin layer of a thick doped crystal is read-out. A selective read-out is preferably achieved by focusing a scanning excitation beam so that only a thin layer of the crystal is substantially excited.

It should be appreciated that a light attenuating crystal which is otherwise sensitive to ionizing radiation can be used to construct an embodiment of the present invention, since long read-out times or repeated read-out can be used to overcome the effects of the attenuation.

Preferably, an electro-optical sensor is used to detect the intensity of emitted light. Alternatively, a line scanner, such as a line CCD scans the crystal one line at a time. Alternatively, a matrix device, such as a CCD camera acquires the emitted light as a single image. Preferably, a panning and zooming optical system is used to focus emitted light into the CCD. Alternatively, the CCD is placed substantially in contact with a face of the crystal, preferably with an optical guide to compensate for size differences between the CCD and the crystal.

Additionally or alternatively, different portions of the crystal are readout separately and, preferably, combined and matched together thereafter.

A memory storage and retrieval apparatus according to a preferred embodiment of the present invention uses a doped crystal as a storage medium. Information is read from the crystal by sequentially exciting specific portions of the crystal with light at the excitation wavelength. An optical detector measures the amount of emitted light. Preferably, large portions of the crystal are excited and read-out simultaneously. A filter is preferably placed in the optical field of the optical sensor to selectively attenuate the excitation wavelength as compared with the emitted wavelength, since both the excitation radiation and the emitted (excited) radiation are present.

Preferably, the detector material is a single doped alkali-halide crystal. However, a poly-crystal, with or without a transparent binder is used in other preferred embodiments.

For the purposes of the present invention, the term luminescence is used to differentiate the operation of the present invention from phosphorescence and photo-stimulated luminescence. The term "ionizing radiation" as used herein, includes X-ray, gamma-ray, e-beam, nuclear particle and far ultra-violet radiation.

A further preferred embodiment of the invention for utilizing a patterned luminophor for storing data, comprises:

(a) irradiating a detector crystal with ionizing radiation to create a patterned luminophor, wherein a patterned mask is placed between the ionizing radiation and the crystal or wherein a radiation beam irradiates the crystal in a pattern; and (b) exciting the crystal with an excitation beam to excite the luminophor into emitting light.

In a preferred embodiment of the invention, different areas of the detector crystal are doped with different materials in different concentrations so that the patterned luminophor can emit multi-color and multi-intensity patterns.

BRIEF DESCRIPTION OF THE DRAWINGS

The invention will be more fully understood from the following detailed description of the preferred embodiments thereof, taken in conjunction with the drawings in which.

DETAILED DESCRIPTION OF THE PREFERRED EMBODIMENTS

In accordance with a preferred embodiment of the present invention, a ionizing radiation acquisition/storage device uses a doped crystal having the following formula:

$$A^i B^{rii} : M^{2+},$$

wherein $A^i$ is an alkaline metal, preferably, Li, Na, K, Rb or Cs; $B^{rii}$ is a halogen, preferably, F, Cl, Br or I; and $M^{2+}$ is an activator di-valent ion preferably selected from the group $Ge^{2+}$, $Sn^{2+}$ and $Pb^{2+}$. The concentration of the activator $M^{2+}$ is preferably between 0.1 and 1 m% (i.e., approximately $10^{18}$–$10^{19}$ /cm$^3$). Other materials such as disclosed in the background may also be useful in the practice of the invention.

The inventors have found that these materials, when exposed to ionizing radiation, form a semi-permanent record of the radiation, which is not substantially erased by read-out. The ionizing radiation forms $M^{1+}$ luminescent centers in these materials, probably when electrons, freed by the radiation, combine with $M^{2+}$ dopant ions. $M^{1+}$ centers are not "erased" by read-out. In the prior art processes of photo-stimulatable read-out, infra-red light photo-stimulates the crystal to emit visible light. In a preferred embodiment of the present invention, the crystal is read-out by excitation with light of a suitable wavelength, such as ultra-violet light, to emit red or near infra red light. The crystal can be reread many times without substantially degrading the quality of the stored information or the emitted light. Typically, the excitation wavelength used does not stimulate substantial electron-hole recombinations.

The present inventors have also found that exposing the crystal to light of a stimulating wavelength before read-out increases the intensity of the emitted light during read-out. The inventors have found that the intensity increase can be over 10%. The explanation for this phenomena is that the ionizing radiation creates free electrons which form electron-centers, such as F-centers (which are ionized when suitable stimulated). However, stimulating the electrons in the electron centers causes some of the electrons from the F-centers to be captured by $M^{2+}$ ions, to form additional $M^{1+}$ ions, which are luminescent. Thus, the contrast of the stored image is enhanced by the effective addition of a percentage of the electron-center image to the $M^{1+}$ ion image. The excitation light (as opposed to the stimulation light) does not usually cause a substantial amount of electron-hole recombinations. It should be appreciated that the highest concentrations of electron-centers are in portions of the crystal which also have high concentrations of $M^{1+}$ ions.

Alternatively or additionally, the crystal is read-out using prior art methods to obtain the stored photo-stimulation image, and also read-out using the methods described herein to obtain the stored luminescence image. Thus, the efficiency of the crystal is effectively doubled.

One problem with methods of reading image crystals of the prior art is the relatively low signal to noise ratio of images produced when a reasonable (for humans) dose of ionizing radiation is used. As noted above, detector crystal read according to some preferred embodiments of the present invention have an inherent advantage over the prior art because the density of $M^{1+}$ ions can be 100 times as great as the density of free electrons and holes. The inventors have found that read-out of crystals according to the present invention is approximately 3–5 times more sensitive to X-rays as prior art read-out methods. However, if a thin crystal detector is used, as described below, this advantage is reduced, but inherent spatial resolution is greatly enhanced, resulting in a better overall resolution/sensitivity characteristics than the prior art.

Photo-stimulation emission from electron and hole recombination, as utilized in the prior art read-out methods, emits light by releasing energy stored in the crystal by the ionizing radiation. The recombinations decrease the concentration of the electron and hole centers in the crystal. Thus, the total amount of available emitted radiation is determined by the amount of ionizing radiation and the actual amount of emitted radiation is determined by the amount of stimulation.

The ionizing radiation also creates $M^{1+}$ luminescent centers, as mentioned above. Once created, they absorb excitation light and emit light by luminescence, which is directly, and linearly, proportional to the amount of excitation. The number of $M^{1+}$ centers created in a portion of the crystal, is determined by the ionizing radiation. Thus, in the present invention, if a portion of the detector crystal is excited for a longer period of time, more light is emitted by the excited portion during that period of time.

Since the emitted light has a relatively low intensity, the crystal used is preferably transparent to the emitted light. However, a relatively attenuating crystal can also be used, since read-out can be repeated many times, effectively overcoming the effects of the attenuation. It should be noted that the total amount of light which can be emitted by stimulating a photo-stimulatable crystal as in the prior art, is limited by the amount of ionizing radiation to which the crystal is exposed. Thus, if some of the emitted light is absorbed by the crystal itself, the signal to noise ratio of the acquired image is lowered.

However, in a luminescent crystal, according to the present invention, the total amount of emitted light is limited only by the amount of excitation after the irradiation. Thus, if 50% of the emitted light is absorbed by the crystal, exciting the crystal for twice as long and acquiring the light emitted during this period effectively compensates for the attenuation.

According to a preferred embodiment of the present invention, detector crystals are read slowly, so that a substantial amount of light emitted by the crystal can be acquired. Thus, various types of system noise can be overcome. For example, if a CCD camera is used to acquire the emitted light, long acquisition times can be used to lower the dark current component of the SNR (signal to noise ratio). Additionally or alternatively, the photon counting method or the luminescence modulation method may be used to lower the SNR of the read-out.

Alternatively, the crystal is read several times to acquire several images. The images are added together to form an image with a higher signal to noise ratio. It is possible to trade off between beam intensity and beam duration so as to maximize signal to noise ratio for a given amount of crystal heating.

In a preferred embodiment of the invention, wherein a CCD camera is used to acquire the emitted light, the following read-out method is used:

(a) the crystal is stimulated with the highest available intensity of excitation light;

(b) the emitted light is integrated by the CCD until the CCD detector nears saturation;

(c) the CCD image is acquired; and (d) (a)–(c) are repeated until the desired SNR is reached.

According to a preferred embodiment of the present invention a high resolution image is read from the detector crystal using multi-sampling. It is known in the art of image processing that a high resolution image can be scanned with a low resolution sampling method, if low resolution samplings are repeated using a second sampling grid offset from the first grid by half a pixel. This method is known as "super resolution". There is therefore provided a method comprising:

(a) reading a crystal using a low resolution scanning device;

(b) repeating step (a) several times with different sampling grids; and (c) processing the acquired images to create a composite image with a resolution higher than the resolution of any of the individual read outs.

Such super-resolution scanning is not possible in the prior art.

Alternatively or additionally, other image processing methods are used.

According to another preferred embodiment of the present invention multiple levels of detail are acquired. In the prior art, a detector crystal can only be read once, thus, the crystal must be scanned at the maximum possible desired resolution. However, high resolution scanning takes a long time, need a large memory and is not usually needed, certainly not over the entire image. Since preferred embodiments of the present invention enable the crystal to be read many times without loss of image information, the following process is preferred:

(a) parts of the crystal, or the entire crystal, are read at a low resolution;

(b) an operator views the image and selects at least one area of interest; and (c) selected portions of the crystal, corresponding to the at least one area of interest are re-read at a higher resolution.

Steps (b) and (c) can be repeated many times, even after a relatively long period of time, such as a week, depending on the particular crystal material used.

It should be appreciated that the abovedescribed multiple read-out processes cannot be preformed using prior art read-out methods because in the prior art, the stored image is erased by the read-out.

Preferably, the detector crystal is relatively defectless, because defects in the crystal cause scattering of light which lowers the spatial resolution of the read-out. A polycrystalline detector can be used instead of a whole single crystal, preferably with a transparent binder (if the active material is in powder or crushed form), however, the highest spatial resolutions are achievable using a single, transparent and defect-free crystal. Preferably, the crystal is transparent to the excitation radiation. However, transparency to the excitation radiation is not as important as transparency to emitted radiation, since intense radiation can be used for excitation.

It should be noted that in prior art systems a polycrystal is sometimes preferred because of the better light gathering characteristics of a polycrystal. However, in embodiments according to the present invention, a single crystal is preferred since there is no limitation on the amount of emitted light.

In the prior art, where detector crystals are used to image a patient with ionizing radiation and dose levels to the patient are a factor, transparency to the excitation radiation should be as high as possible, since multiple readout is not possible.

Some of the materials used for detector crystals are damaged by exposure to normal room environment, therefore they are usually protected with a thin layer of quartz glass, ultra violet glass, a suitable polymer (polycarbonate, PMMA), CaF, BaF or other materials which are both transparent and non-scattering. In a preferred embodiment of the present invention, a detector crystal is placed inside the mouth or other body cavities. The crystal is preferably covered with a disposable or sterilizable slip cover which is transparent to ionizing radiation and protects the crystal from the human body environment. During read-out, the slip cover is preferably removed, thus, it need not be transparent to the excitation or the emitted radiation.

As indicated above, it is believed that the molecular process utilized in some aspects of the present invention are different from the molecular process utilized in the prior art. When the ionizing radiation interacts with the crystal, some of the free electrons are captured by the dopant, thus, the $M^{2+}$ ions become $M^{1+}$ ions. An $M^{1+}$ ion is a luminescence center and is stable at room temperature (in the crystal). This interaction is utilized in the present invention. When the $M^{1+}$ luminescence center absorbs ultra-violet light it emits red or near infra red light. Since the $M^{1+}$ luminescence center is stable at room temperature and is not appreciatively affected by ultra-violet light or by normal room lighting, the crystal can be handled without special precautions and can be read many times without losing information.

Figure 3:
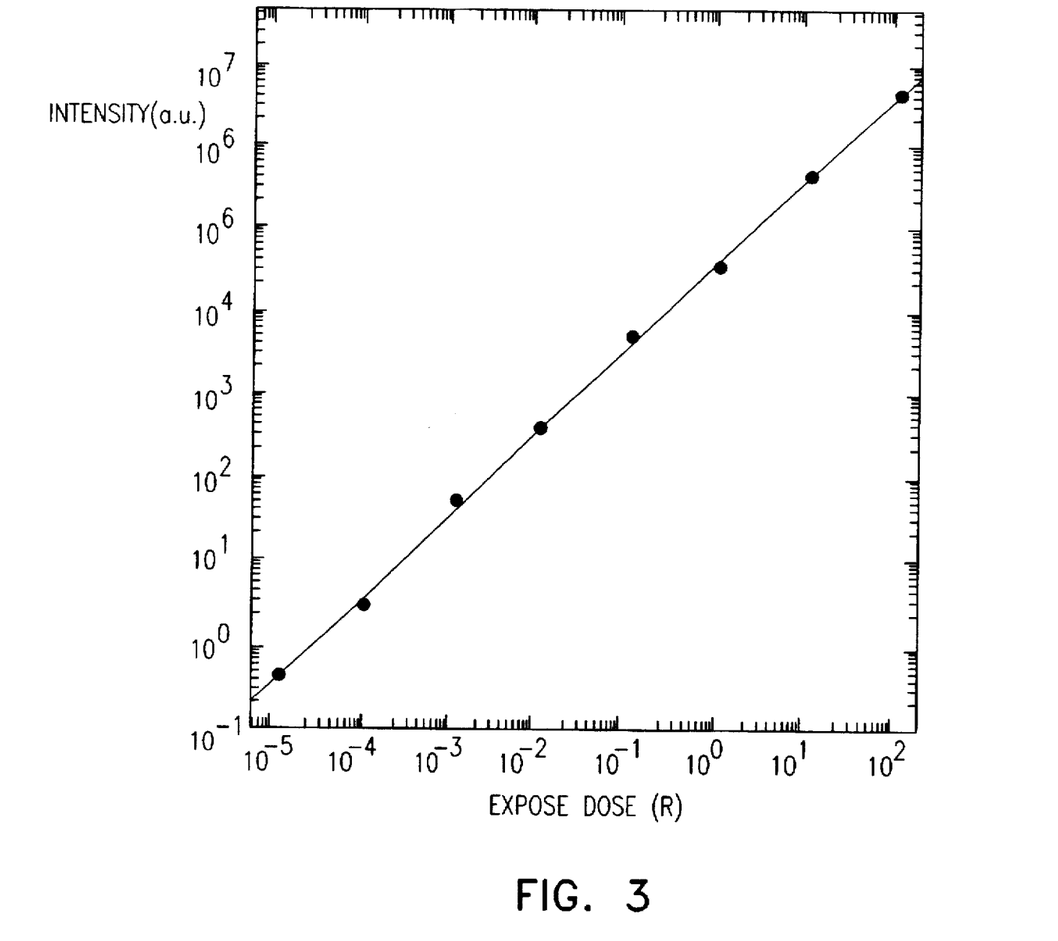
FIG. 3 is a graph showing the relationship between the X-Ray exposure of a crystal and the intensity of the luminescence induced during read-out with a constant read-out beam according to a preferred embodiment of the present invention.

In addition, the gray-level resolution achieved using some preferred embodiments of the present invention is higher than in prior art. In prior art the gray-level resolution is limited by the number of stable electron and hole centers that are created in the crystal by the ionizing radiation. The maximum density of stable electron and hole centers at room temperature is approximately $10^{16}/cm^3$. In some embodiments of the present invention the density of $M^{2+}$ ions is approximately $10^{19}/cm^3$. At these densities, $10^{19}$ $M^{2+}$ ions/$cm^3$ are transformed to $M^{1+}$. Thus, image quality and crystal sensitivity are better than in the prior art. FIG. 3 shows the example of a relationship between the amount of ionizing radiation exposure (X-Ray) and the intensity of light emitted at a wavelength of 900 nm as a result of excitation with constant strength excitation radiation of 100 µW/cm² at a wavelength of 254.4 nm, for KCl:Pb, with the $Pb^{2+}$ concentration at $1.5*10^{18}$. As can be seen from the graph, the relationship is substantially linear over eight orders of magnitude.

This great dynamic range of the detector crystal has a first advantage that it is easier to calculate the required X-ray dosage since the chances of under-exposure and over-exposure are reduced. A second advantage is the suitability of the detector crystal for many applications which require a wide dynamic range, for example, industrial applications.

Read-out of an image having a very wide dynamic range is typically difficult since the optical sensor which acquires the emitted light (such as a CCD) typically has a relatively narrow dynamic range. A first preferred method of overcoming this problem is to acquire a first image of the light emitted by the crystal and use the distributions of the gray-levels in the image to set the gain and base-level on the optical sensor. A second preferred method is to acquire a first image of the light emitted by the crystal and then acquire light from different parts of crystal at different gain and base-level settings which are optimized for that locality.

A third preferred method is to acquire light from of portions or all of the crystal at several sensor settings and then to combine the resulting images to form an image with a higher dynamic range. For example, if the dynamic range of the crystal is 8 (orders of magnitude) and the dynamic range of the optical sensor is 4 (orders of magnitude), a first image is acquired so that the sensor has a gain of 1 and a base-level of 0, resulting in the first image corresponding to the lower intensities of the emitted light. A second image is acquired so that the sensor has a gain of 1 and a base-level of 4, resulting in the second image corresponding to the higher intensities of the emitted light. When the first and second images are combined, the resulting compound image corresponds to all 8 orders of magnitude.

It should be appreciated that the above described methods of reading an image with a wide dynamic range are especially suitable for read-out methods which do not corrupt the stored data.

Preferably the crystal is reset to its previous, non-luminescent state by heating it to a temperature higher than the stability temperature of the $M^{1+}$ ions. Typically, this temperature is between 100° C. and 200° C.

In prior art devices a thick crystal is preferred because a thick crystal has more interaction with the ionizing radiation than a thin crystal and, thus, more electron and hole centers are formed. This results in more intensity and more usable gray levels in the final image. However, thick crystals have several disadvantages. First, they are more expensive. Second, when an electron recombines with a hole, it emits light in all directions. Emitted light which strikes the crystal surface at an angle above the Brewster angle (which depends on the refractive index of the material) is reflected back into the crystal. Thus, light emitted by a recombination center is spread over a portion of the crystal face, whose circumference is dependent on the distance of the electron from the crystal surface, i.e., the further the emitting electron is from the surface, the more of the emitted light will escape the crystal over a large area. Scattering of the emitted light inside the crystal also increases the light emission area.

Thus, it is not generally practical to simultaneously stimulate and acquire emitted light from an entire crystal using prior art methods. If a thin crystal were used in the prior art, the resolution is good, but the emitted light intensity levels are low, which results in a low contrast image being acquired. If a thick crystal is used, the acquired resolution is very low, since light emitted from different portions of the crystal overlap. However, scanning a thick crystal yields a higher acquired resolution, since there need not be any overlap of emitted light. In general, scanning systems are more complicated and expensive than simultaneous acquisition systems.

In a preferred embodiment of the present invention, a thin crystal detector layer is used. Preferably, a thick crystal is used, of which only a thin layer, for example a surface layer, is doped with $M^{2+}$.

Alternatively, a thick crystal having a stepped doping cross-section is used. The crystal is doped to have a first, relatively low, concentration of dopant and a second, relatively high, concentration of dopant in a thin layer, preferably near its surface. Preferably, the total amount of dopant in the thin layer is twice the total amount of dopant in the thick layer, so that when the crystal is excited, twice the amount of light is emitted from the thin layer as from the thick layer. This results in a good tradeoff between sensitivity and resolution.

Figure 4:
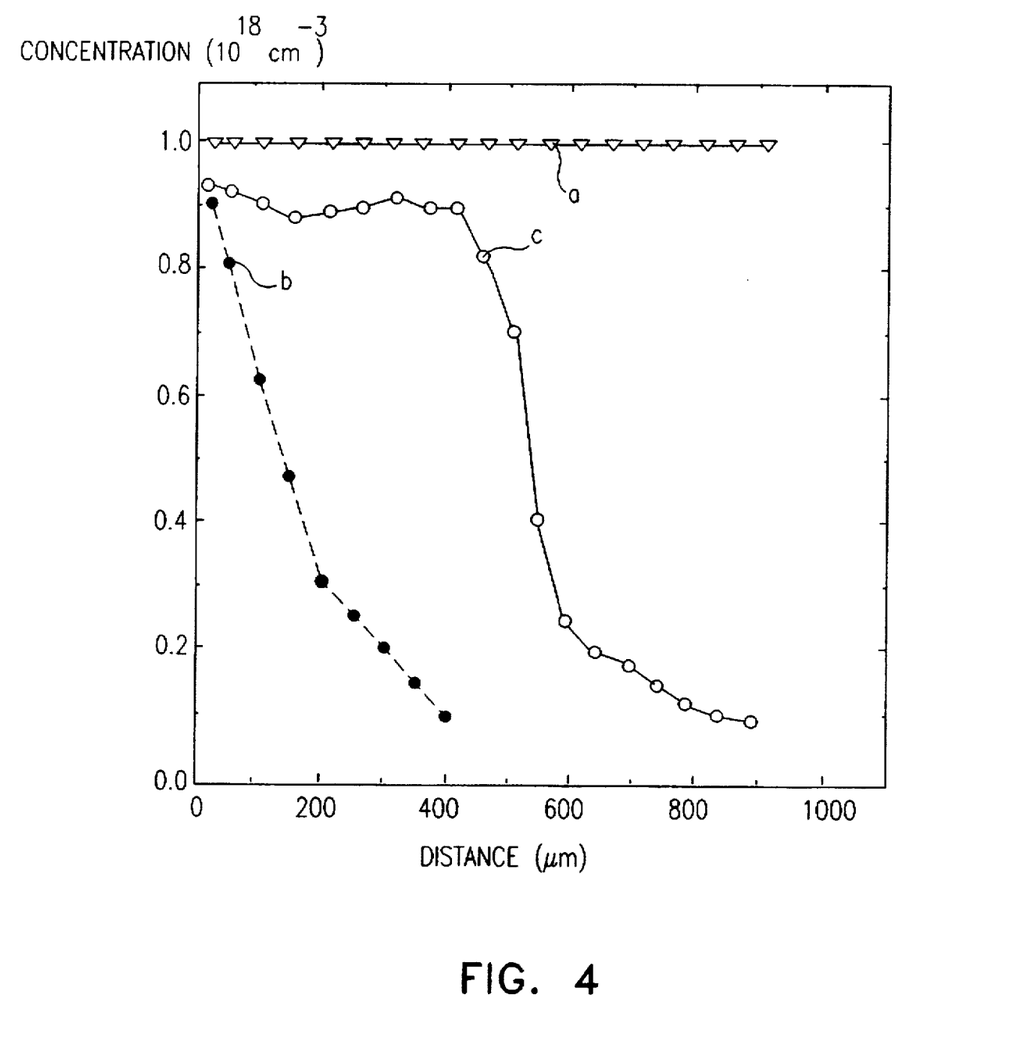
FIG. 4 is a graph showing different diffusion profiles in crystals used in preferred embodiments of the present invention.

Preferably, the surface layer is formed by doping a crystal by diffusion from a gaseous or liquid source or by epitaxy. FIG. 4 shows doping profiles of KCl:Pb crystals manufactured using three different methods which are preferred for productions of detector crystals for preferred embodiments of the present invention.

A first method includes growing the crystal in melt from a mixture of the alkali-halide crystal and the dopant. Many methods are known in the art for growing doped crystals in the melt and are disclosed in the references in the background, such as Kyropoulos or Stokbarger. This results in the doping profile of curve (a) of FIG. 4. A second method includes growing an undoped crystal and then diffusing a dopant into the crystal's surface. Typically, the undoped crystal is placed in an evacuated quartz vessel or a stainless steel bomb with the dopant, in a pure metallic or salt form, placed on the quartz crucible or on the surface of the crystal. The crystal and dopant are then heated to a temperature slightly below the melting point of the crystal for a given period of time. For example, to produce a dopant profile according to curve (b) of FIG. 4, the crystal is covered with $PbCl_2$ and heated at 450° C. for 25,000 seconds. To produce the profile shown in curve (c) of FIG. 4, the crystal is heated at 600° C. for 60,000 seconds using the same dopant. It can be appreciated that different temperatures and times are used for different types of crystals and different required doping profiles.

Figure 1:
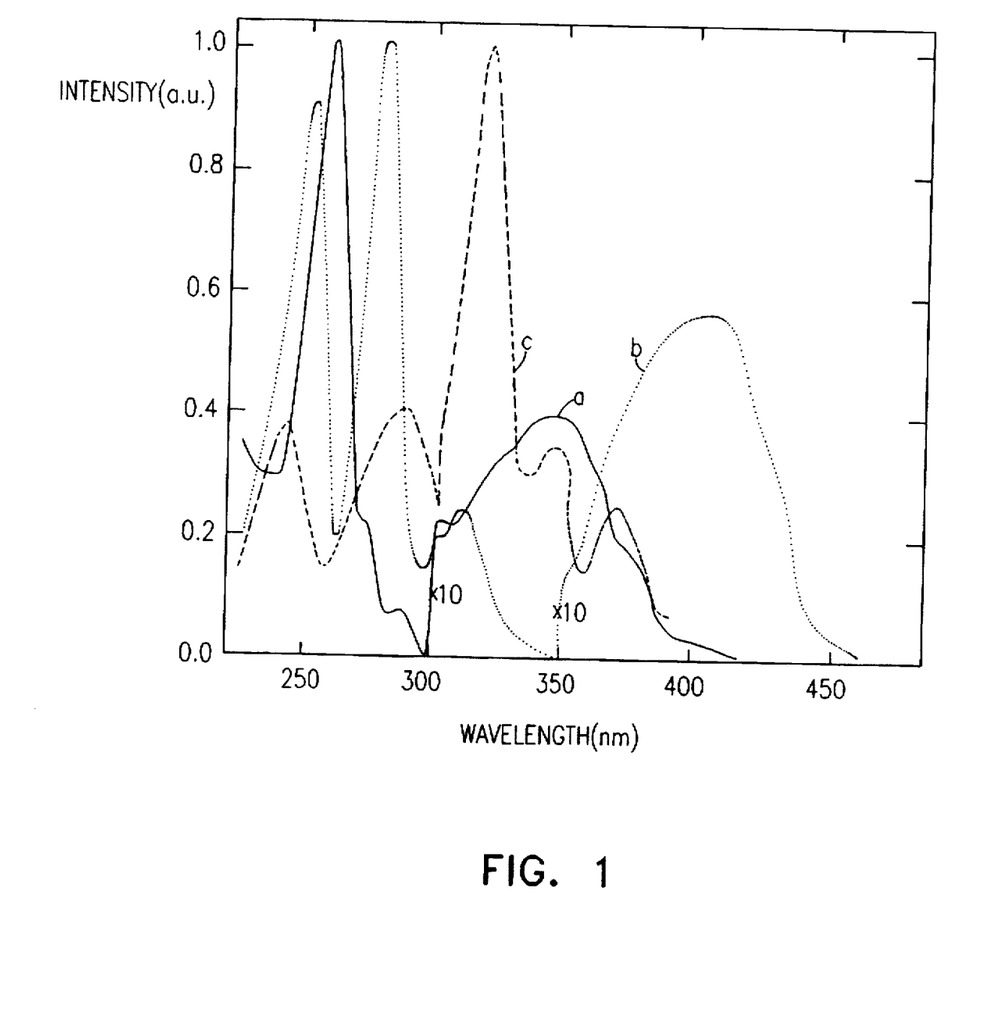
FIG. 1 is a graph showing the excitation spectra of three preferred crystals in accordance with a preferred embodiment of the invention.

FIG. 1 shows the normalized sensitivity, after X-ray irradiation, of three preferred materials to excitation by ultra violet radiation. It should be noted that each one of the materials shown has a different sensitivity, which is normalized on the graph of FIG. 1. Also, the "x10" symbols on the graph lines indicate that the portions of the curve to the right of the symbol is shown at 10 times magnification. The materials are (a) KCl:Pb having $1.6*10^{18}$ $M^{2+}$ ions/$cm^3$; (b) KBr:Pb having $10^{18}$ ions/$cm^3$; and (c) KI:Pb having $2.5*10^{18}$ ions/$cm^3$. As shown in FIG. 1, all three materials are sensitive to excitation by ultra violet radiation in the general range of 225–325 nanometers. In general, 1 quanta of 50 kV X-ray irradiation produces between 1000–5000 $M^{1+}$ ions.

Figure 2:
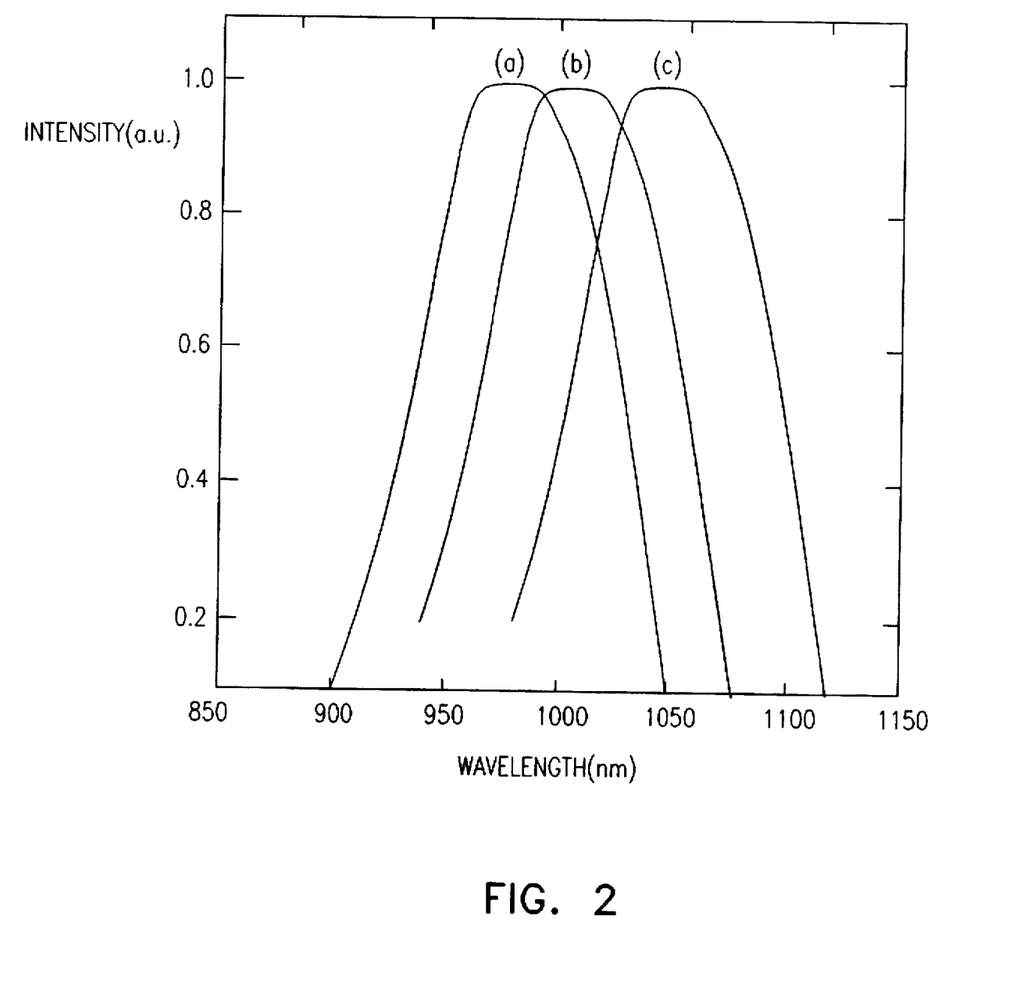
FIG. 2 is a graph showing the luminescence spectra of the three crystals of FIG. 1.

FIG. 2 shows the wavelength of the radiation emitted by the same three materials in response to excitation. The excitation wavelengths are center about 254 nm for (a) KCl:Pb; 277 nm for (b) KBr:Pb; and 317 nm for (c) KI:Pb. The intensities are normalized. However, the inventor has found that the quantum efficiency of the excitation-emission is approximately 0.3 for KCl:Pb. As shown In FIG. 2, the emitted radiation is near infra red having wavelengths between 900 and 1125 nanometers, depending on the material. As can be appreciated, the excitation and emission spectra are clearly differentiated, so that a detection system can filter out the excitation radiation without substantially attenuating the detected emission radiation.

In a preferred embodiment of the invention, the detector crystal is doped with a mixture of dopants, for example, KCl:Pb:Sn. Since each dopant, after irradiation, is excited by a different wavelength of ultra-violet light, each can be excited separately. In addition, each dopant emits light having a different wavelength, so that different emission spectra are possible by varying the doping concentrations and the excitation wavelength.

Figure 5A:
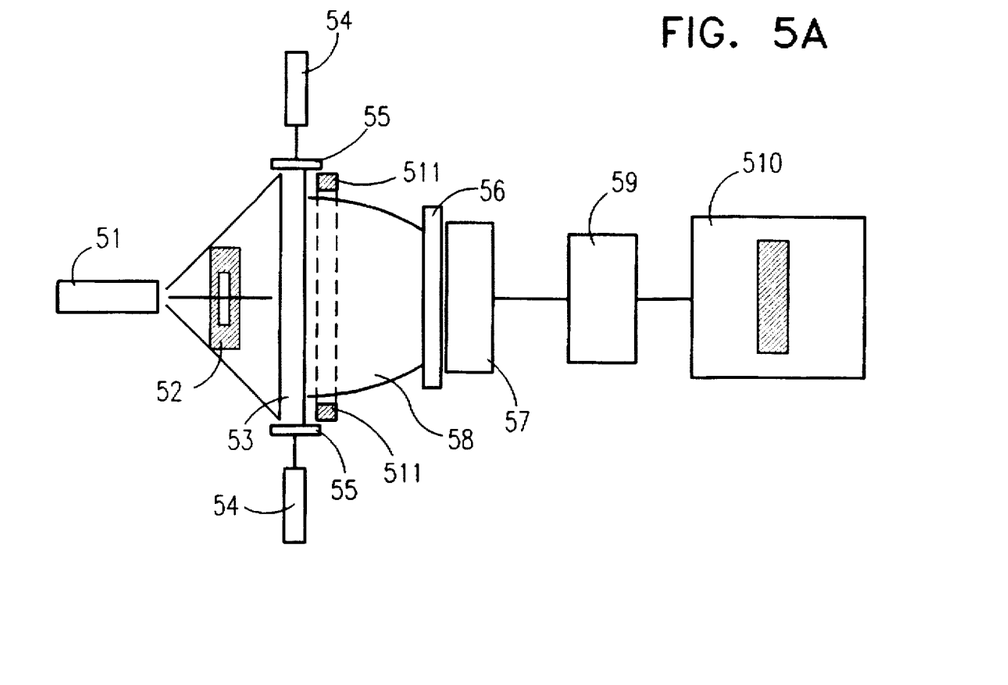
FIG. 5A is a schematic side view of a read-out system in accordance with a preferred embodiment of the present invention.

FIG. 5A shows a device, constructed according to a preferred embodiment of the present invention, which acquires a whole image simultaneously without scanning. An object 52 to be imaged (which may be, for example a portion of a human) is placed between a source of ionizing radiation 51 and a detector crystal 53. Typically, source 51 is an X-ray source.

To read the latent image, one or more excitation light sources 54 are arranged so that they illuminate preferably transparent crystal 53 from its lateral edges. Alternatively, crystal 53 is excited by shining excitation light through one of its faces. Preferably, a UV-passing filter 55 is placed between sources 54 and crystal 53 so that only ultraviolet light reaches crystal 53 from sources 54. Preferably, source 54 is a deuterium lamp, a low pressure mercury lamp, a fourth harmonic Nd-YAG laser at 256 nanometers, a second harmonic Argon ion laser, a KrF eximer laser at 249 nanometers or an AgF eximer laser at 190 nanometers.

Light emitted by crystal 53 in response to excitation by sources 54, is transformed by an imaging element 57, into electric signals. These signals are transformed into an image by a processor 59 for display on a display 510. Element 57 is preferably a micro-channel photomultiplier or a CCD camera. Preferably element 57 has a high sensitivity because the emitted light intensities are relatively low. A filter 56 is preferably placed between crystal 53 and photoelectric element 57 to admit only wavelengths of the emitted light. If photoelectric element 57 is smaller than crystal 53, an optical reducing means 58 preferably transfers light from crystal 53 to photoelectric element 57. Preferably, means 58 are a lens arrangement or a fiber-optic reducing plate.

Preferably a heating apparatus 511, such as a heating coil, is operative to heat crystal 53 for erasure thereof when a new image is to be acquired.

It should be appreciated that the apparatus shown in FIG. 5A may be split into two and used in a two step method. A first step comprises exposing detector crystal 53 to source 51, using an apparatus comprising source 51, object 52 and crystal 53. A second step is to use an apparatus comprising the rest of the elements shown in FIG. 5A to read-out crystal 53.

In a preferred embodiment of the invention, particularly useful when crystal 53 has a stepped doping profile, the scanning light is focused so it excites only a thin layer of crystal 53. Thus, the surface layer of crystal 53 can be read-out independently of the rest of crystal 53. In general, when a thinner layer of crystal is read the spatial resolution achieved is higher, albeit with a lower signal to noise ratio. Thus, during read-out, a tradeoff can be achieved between read-out time, spatial resolution and contrast resolution. It should be noted, that since crystal 53 can be reread many times without deteriorating the stored image, several trade-off situations can be achieved for the same exposure. Additionally or alternatively, crystal 53 is doped with a combination of dopants, such that a thin layer of crystal 53 is excitable by one excitation wavelength and other layers are excitable with other wavelengths.

A preferred embodiment of the invention uses detector crystals for dental X-ray images. A detector crystal is placed in a patients mouth, so that a tooth is situated between the crystal and an X-ray source. The X-ray source is activated, so that an image of the tooth is written into the crystal. Then, the crystal is placed in a special read-out machine either for hard-copy creation or for direct viewing by a dentist. The inventors have found that an X-ray image with a quality similar to that generally produced by X-ray films using a significantly smaller amount of X-ray dose. In a test conducted with an X-ray test plate the measured MTF (modulation transfer function) was 20% at 10 line-pairs/mm, i.e., twice as good as standard X-rays, which have an MTF of 20% at 5 line-pairs/mm.

Figure 5B:
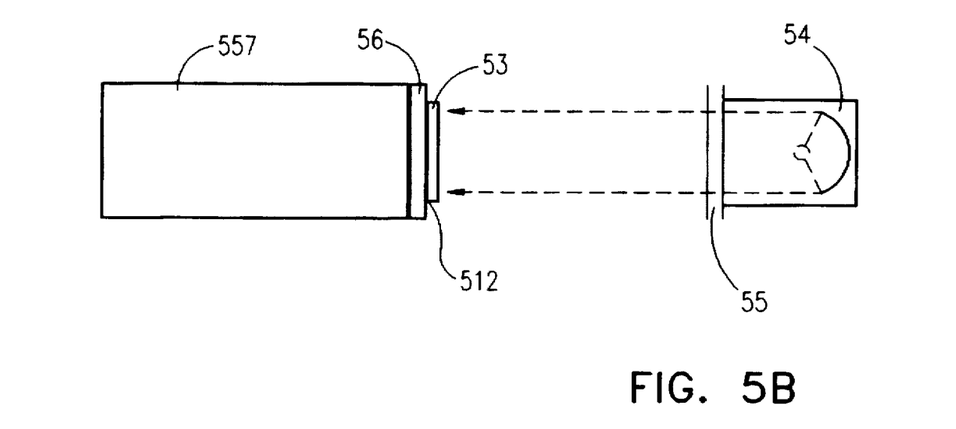
FIG. 5B is a schematic side view of a read-out system adapted for dental imaging, in accordance with another preferred embodiment of the invention.

FIG. 5B shows a preferred embodiment of the invention adapted for dental X-ray images. In dental imaging, the size of crystal 53 must be small enough to fit into a patients mouth, for example, 3 cm×4 cm and a thickness of 1 mm. In a preferred embodiment, the entire crystal 53 is simultaneously excited by light source 54 and the emitted light is read-out in parallel by a photoelectric matrix sensor 557 on which crystal 53 is directly placed. Sensor 59 is preferably a CCD or a MCT (multichannel photomultiplier tube). Preferably, an optical matching 512 is used between crystal 53 and filter 56. In a further preferred embodiment of the invention, a fiber-optic reducing plate is used to match the size of crystal 53 and optical sensor 59. Alternatively, light source 54 is a scanning light source. It should be noted that this embodiment is also suitable for prior art read-out methods.

Figure 6A:
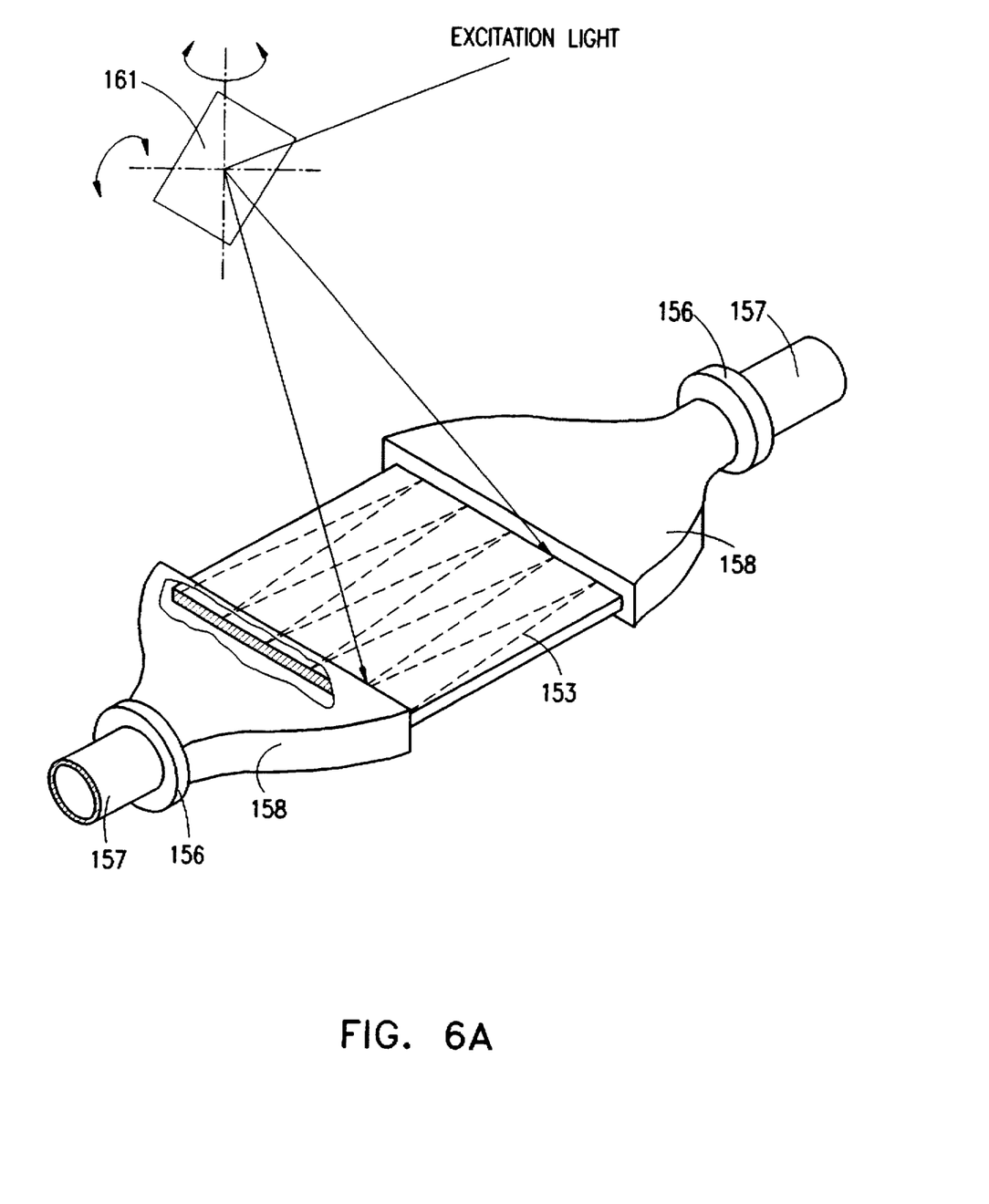
FIG. 6A is a schematic perspective view of a portion of a read-out system in accordance with another preferred embodiment of the present invention.

FIG. 6A shows another preferred embodiment of the present invention in which a detector crystal 153 is serially scanned. In this embodiment, crystal 153 is excited by a scanning light source and the emitted light is acquired by at least one detector element 157 through the lateral faces of crystal 153. Preferably, detectors 157 are coupled to crystal 153 via an optic coupling 158, such as a fiber optic reducing plate or a light channel. Preferably an infra red passing filter 156 is placed between crystal 153 and detectors 157, to block the u.v. excitation light from reaching detectors 157.

The scanning light source is preferably a laser beam which is pointed at a specific point on crystal 153 using a mirror 161. Alternatively, other light sources are used, preferably, the light sources are filtered with an ultraviolet passing filter. Filters which pass only ultra violet light or only infra red light are available from a number of suppliers such as from Schott Glaswerke: G Hattenbergstrabe 10, W-6500 Mainz, Germany.

Alternatively, crystal 153 is scanned line by line and read-out using a line CCD. Alternatively, small overlapping portions of crystal 153 are excited and acquired by a matrix device, such as a CCD camera. The acquired images are patched together using known image processing techniques.

Alternatively to scanning, either large portions or all of crystal 153 are excited at one time. However, acquiring the emitted light is preferably performed over small portions of crystal 153, such as by scanning. It should be noted, that unlike prior art read-out methods, exciting a portion of the crystal does not erase the stored image, so there is no penalty for exciting portions of crystal 153, without acquiring the light emitted therefrom. Alternatively to scanning the emitted light, a CCD camera with a zoom/pan arrangement selectably acquires portions of the stored image at different resolutions.

Alternatively, other scanning methods are used, such as bar scanning. Most scanners can be adapted to scan a detector crystal according to the present invention, if their light source is adapted to emit ultra violet light and their imaging bar adapted to be sensitive to low light levels.

Figure 6B:
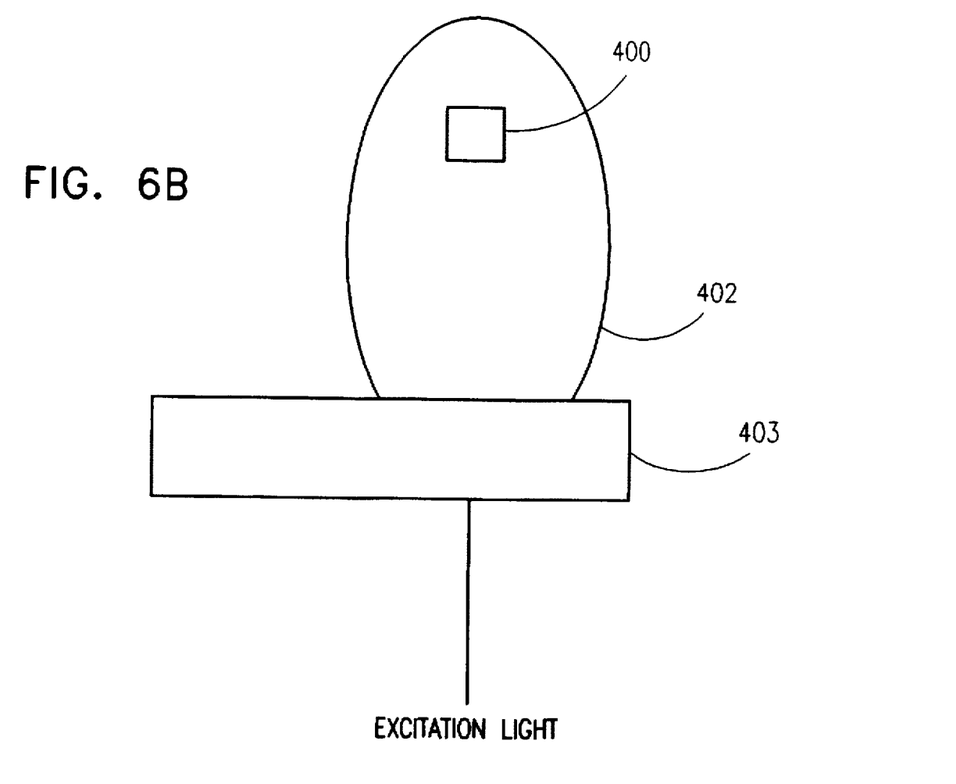
FIG. 6B shows schematically a preferred mirror arrangement for capturing light emitted by a crystal.

FIG. 6B shows an alternative embodiment wherein a crystal 403 is viewed by a detector 400 through an ellipsoid mirror lens arrangement 402 which focuses a major portion of the light onto the detector. Alternatively, crystal 403 is itself placed in a mirror arrangement which reflects a substantial portion of the light emitted by crystal 403 towards detector 400.

Using the methods of the present invention, the efficiency/sensitivity/resolution trade-offs possible are similar to film and film-phosphor combinations and significantly better than prior art storage crystals.

Figure 7:
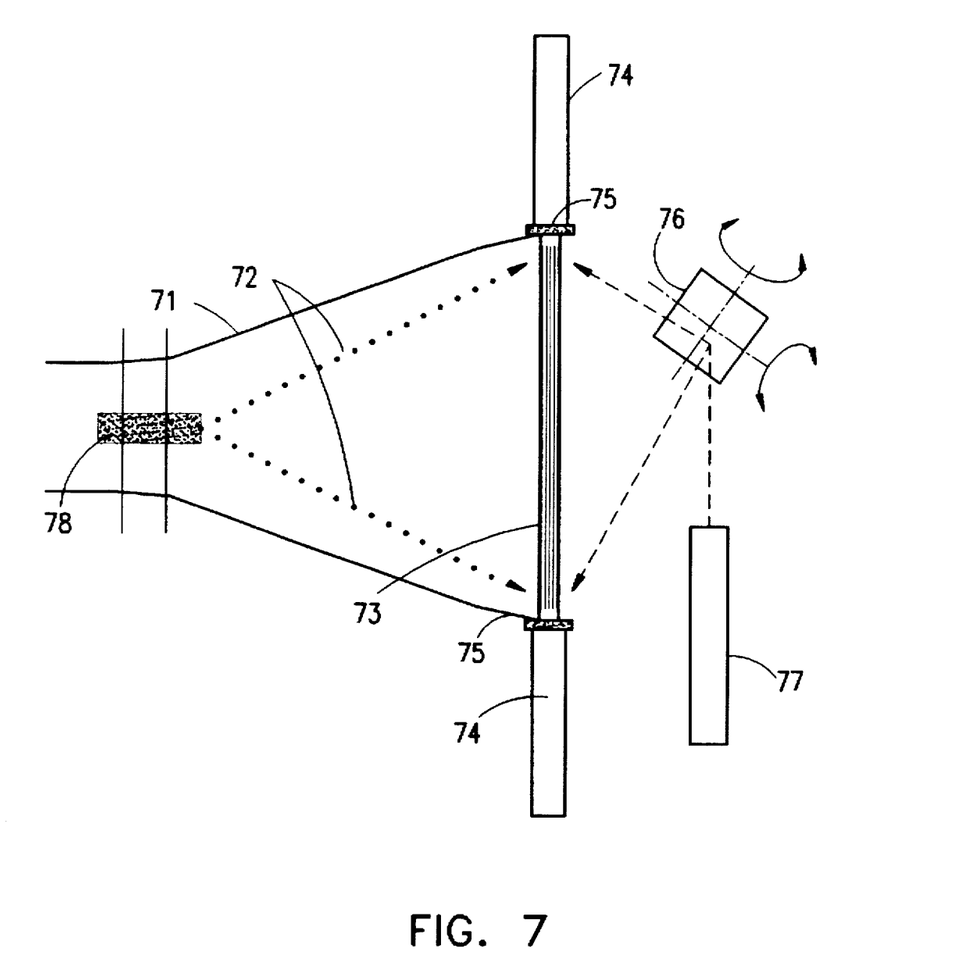
FIG. 7 shows a schematic representation of a memory device in accordance with a preferred embodiment of the invention.

FIG. 7 shows a memory device in accordance with a preferred embodiment of the present invention. A detector crystal 73, as described hereinabove, is written on by a scanning electron beam 72. Beam 72 is controlled by a beam positioner 78, such as an electron gun, to selectably irradiate crystal 73. Typically, a electron beam energy of between 10 and 50 keV is used for creating $M^{1+}$ luminescence centers. The achievable storage density is approximately $10^6$ bit/ $cm^2$, where each bit is a $M^{1+}$ luminescence center concentration of about 10 μin diameter. To read information from crystal 73, a light source, preferably a laser 77 is directed by a scanning system 76 to selectably excite a small portion of crystal 72. The emitted light passes through a filter 75 to block the excitation frequencies and is acquired by a sensor 74. The acquired signal is passed to a signal analyzer (not shown) which transforms the signal to a digital information stream.

It should be noted that the storage density of the memory device can be increased by using a multi-doped crystal 73, and using several light sources to selectably excite only some of the doping ions.

Figure 8:
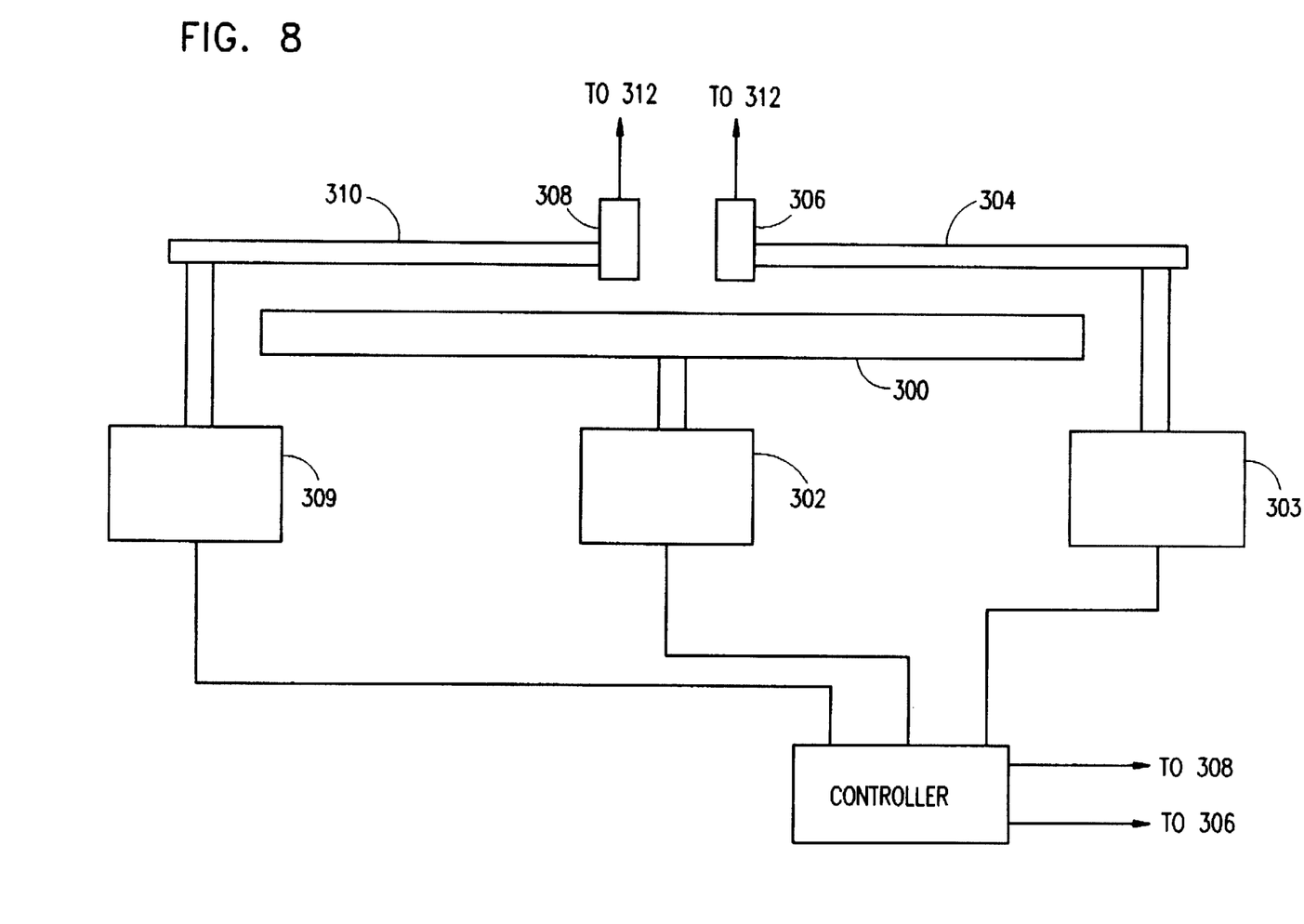
FIG. 8 shows a schematic representation of a disk drive utilizing a preferred embodiment of the invention.

Alternatively, a scanning mechanism such as that used in disk drives is used. FIG. 8 shows such an apparatus. A crystal 300 is rotated by a motor 302 at high speed. A read head 306 and an optional write head 308 are mounted on arms 304 and 310 respectively so that they can be positioned at any radius of crystal 300 by motors 303 and 309 respectively. A controller 312 controls motor 302, read head 306, write head 308 and motors 303 and 309. The operation of read head 306 and write head 308 is substantially as described above, except that the optical sensor for acquiring emitted radiation is preferably mounted next to read head 308, so that multiple read operations may be performed simultaneously on different parts of crystal 300. Additionally or alternatively, a CCD camera or strip is used instead of a single optical sensor. In this embodiment, a wide beam is preferably used to excite crystal 300 and a large amount of data can be read in parallel. In addition, the precision required for placement of the excitation beam and read head are reduced since a large portion of crystal 300 is read simultaneously. Alignment or reference patterns are incorporated in the stored image for each irradiated area to allow correlation between the image of the large portion and the memory addresses in the region. Alternatively or additionally, crystal 300 is patterned using different dopants, so that read head 308 is aligned using the wavelengths of emitted radiation.

Erasing information on crystal 300 is preferably performed by heating the entire crystal. Alternatively, a small portion of crystal 300 is first read to save its stored data and then erased using a movable erase-head (not shown) which heats local portions of the crystal. The extent of the erase is not known precisely before erasing, because of heat conduction, so a larger portion of crystal 300 than needs be erased is heated. Portions of crystal 300 which were unnecessarily erased are rewritten using the data originally read.

It will be appreciated by a person skilled in the art the present invention is not limited by what has been described hereinabove. Rather, the scope of the invention is only limited by the following claims:

We claim:

1. A method of image acquisition comprising:

providing a material having a pattern of luminescent centers;

exciting said material with excitation radiation to emit light by luminescence; and acquiring said light.

2. A method according to claim 1, wherein said providing, comprises, irradiating a material with patterned ionizing radiation to form luminescent centers.

3. A method of acquiring an ionizing radiation image comprising:

irradiating a material with patterned ionizing radiation;

exciting said irradiated material with excitation radiation to emit light in accordance with the pattern; and acquiring said emitted light, wherein said excitation radiation has a wave length which does not cause substantial electron-hole recombinations in said material.

4. A method according to claim 3, wherein said irradiation forms luminescent centers in said material and wherein said excitation radiation has a wave length suited for excitation of said luminescent centers.

5. A method according to claim 2, wherein said excitation does not cause substantial reduction of said luminescent centers.

6. A method according to claim 3, including:

further exciting said material at least a second time to emit light; and further acquiring the emitted light, to form a second image only if the emission is of a similar strength as the emission of a previous acquisition.

7. A method according to claim 6 including:

combining information obtained from the light acquired in response to the first and second excitations to form an image.

8. A method of acquiring an ionizing radiation image comprising:

irradiating a material with patterned ionizing radiation to form a pattern of luminescent centers;

exciting said irradiated material a first time with excitation radiation to emit light in accordance with the pattern of centers;

acquiring the light emitted in response to the first excitation radiation;

further exciting said irradiated material a second time with excitation radiation to emit light in accordance with the pattern of centers; and further acquiring the light emitted in response to the second excitation radiation.

9. A method according to claim 7, further comprising processing said light acquired from the multiple excitations to form a combination image having a higher contrast than an image formed from a single excitation.

10. A method according to claim 7, further comprising processing said light acquired from the multiple excitations to form a combination image having a higher resolution than an image formed from a single excitation.

11. A method according to claim 7, further comprising processing said light acquired from the multiple excitations to form a combination image having a wider dynamic range than an image formed from a single excitation.

12. A method according to claim 6, including:

further exciting said material an additional time to emit light; and further acquiring the emitted light from said additional excitation at a spatial resolution higher than that of a previous acquisition.

13. A method according to claim 3, wherein said excitation radiation has a wave length shorter than said emitted light.

14. A method according to claim 3, further comprising exposing said material to light before said excitation, wherein said exposure light causes electrons and holes in said material to recombine.

15. A method according to claim 3, further comprising exposing said detector crystal to light before said excitation, wherein said exposure light causes electrons in said material to form new luminescent centers.

16. A method of acquiring an ionizing radiation image comprising:

irradiating a material with patterned ionizing radiation;

exposing said irradiated material to light, wherein said exposure light causes electrons and holes in said material to recombine;

exciting said exposed material with excitation radiation to emit light by luminescence in accordance with the pattern; and acquiring said emitted light.

17. A method according to claim 16, further comprising acquiring light emitted by the recombinations of holes and electrons.

18. A method of acquiring an ionizing radiation image comprising:

irradiating a material with patterned ionizing radiation;

exposing said irradiated material to light, wherein said exposure light is of a wavelength that causes electrons in said material to form luminescent centers;

exciting said exposed material with excitation radiation to emit light in accordance with the pattern; and acquiring said emitted light.

19. A method according to claim 3 wherein the exciting radiation is ultra-violet radiation.

20. A method of acquiring an ionizing radiation image comprising:

irradiating a material with patterned ionizing radiation;

exciting said exposed material with ultra-violet excitation radiation whereby said material emits light in accordance with the pattern of the ionizing radiation; and acquiring said emitted light.

21. A method according to claim 20 wherein the excitation radiation is in the far ultraviolet.

22. A method according to claim 3, wherein said material comprises a plurality of regions, and wherein at least one of the regions emits light having a different wave length from at least one other of the regions.

23. A method according to claim 3, wherein said material comprises a poly-crystal.

24. A method according to claim 3, wherein said material comprises substantially a single crystal.

25. A method according to claim 3, wherein said material comprises a doped crystal having the formula:

$$A^i B^{vii}:M^{2+}.$$

wherein $A^i$ is an alkaline metal, $B^{vii}$ is a halogen, and $M^{2+}$ is an activator di-valent ion selected from the group comprising $Ge^{2+}$, $Sn^{2+}$ and $Pb^{2+}$.

26. A method in accordance with claim 25, wherein irradiating the material with patterned excitation radiation causes at least some of the $M^{2+}$ ions to be activated to $M^{1+}$ ions.

27. A method according to claim 26, wherein said material comprises a doped crystal doped with a plurality of species of dopant ions.

28. A method according to claim 26, wherein said material has a non-uniform doping profile.

29. A method according to claim 28, wherein said material comprises a surface doped crystal.

30. A method according to claim 28, wherein said doping profile comprises a thin heavily doped layer and a thick lightly doped layer.

31. A method according to claim 30, wherein said thin layer has a total amount of dopant approximately twice the amount of dopant as the thick layer.

32. A method according to claims 26, wherein said ionizing radiation comprises X-ray radiation.

33. A method according to claim 26, wherein said ionizing radiation comprises gamma ray radiation.

34. A method according to claim 26, wherein said ionizing radiation comprises electron beam radiation.

35. A method according to claim 26, wherein said ionizing radiation comprises nuclear particle radiation.

36. A method according to claims 26, wherein said ionizing radiation creates free electrons in said material.

37. A method according to claim 36 wherein the $M^{1+}$ sites are formed by irradiation of material having $M^{2+}$ sites with said ionizing radiation and wherein at least some of the $M^{2+}$ sites are transformed into $M^{1+}$ sites by electron capture.

38. A method according to claim 26, wherein said pattern is formed by passing ionizing radiation through a human body.

39. A method according to claim 26, wherein said exciting comprises excitation of all of said material simultaneously.

40. A method according to claim 26, wherein said acquiring comprises:

first acquiring light emitted from portions of said material along a first line; and later acquiring light emitted from portions of said material along a second line.

41. A method according to claim 26, wherein said acquiring comprises:

(a) acquiring images of light emitted from different portions of said detector using a matrix detector to form partial images; and (b) forming an image which is a mosaic of said partial images.

42. A method according to claim 26, wherein said acquiring comprises:

(a) acquiring said emitted light at one resolution; and (b) subsequently acquiring emitted light at a second resolution.

43. Apparatus for storage and retrieval of data comprising:

a storage medium having a pattern of luminescent centers; and a source of light at a first wavelength, selectably positionable with respect to said storage medium to excite the luminescent centers at a location thereon to emit light at a second wavelength;

an optical detector sensitive to the second wavelength, wherein the second wavelength is longer than the first wave length.

44. Apparatus according to claim 43, further comprising, a source of ionizing radiation selectably positionable on said storage medium and having an energy suitable for forming said centers.

45. Apparatus according to claim 43, further comprising a filter for filtering out said exciting light from said emitted light prior to its detection by the optical detector.

46. Apparatus according to claim 43, wherein said luminescent centers are $M^{1+}$ ions.

47. Apparatus according to claim 44 wherein the sites are formed by ionizing a material containing $M^{2+}$ ions and capture of electrons to form $M^{1+}$ centers formed from said $M^{2+}$ ions by said ionizing radiation.

48. A patterned luminophor comprising:

at least a first surface region having a first density of luminescent centers; and at least a second surface region having a second, different, density of luminescent centers.

49. A luminophor according to claim 48, wherein said patterned luminophor is created by illumination of a non-patterned non-luminophor with ionizing radiation.

50. A method of image acquistion, comprising:

providing a material having a pattern of luminescent centers;

exciting said material with excitation radiation to emit light by luminance, such that the emitted light has a longer wavelength than said excitation light; and acquiring said light.

51. A method according to claim 50, wherein each of said luminescent centers comprises a single dopant ion.

52. A method of acquiring an ionizing radiation image comprising:

irradiating a material with patterned ionizing radiation;

exposing said irradiated material to light, wherein said exposure light causes electrons and holes in said material to recombine;

exciting said exposed material with excitation radiation to emit light by luminescence, in accordance with said pattern, which emitted light is not generated by electron-hole recombination; and acquiring said emitted light.

\* \* \* \* \*